Patented May 18, 1943

2,319,197

UNITED STATES PATENT OFFICE 2,319,197

PRODUCTION OF PHENYL O-PHENOXYL-BENZOATE

Paul W. Bachman, Summit, N. J., and Berndt W. Hammarén, Floral Park, N. Y., assignors to General Chemical Company, New York, N. Y., a corporation of New York No Drawing. Application January 15, 1940, Serial No. 313,922

2 Claims. (Cl. 260—476)

This invention relates to the manufacture of phenyl o-phenoxybenzoate, that is, the phenyl ester of o-phenoxybenzoic acid,

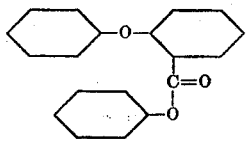

from diphenyl-carbonate,

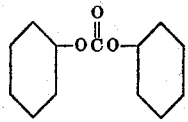

It is known that phenyl o-phenoxybenzoate may be prepared by heating diphenyl-carbonate with a small proportion of sodium carbonate. The reaction also has been disclosed as operative employing a small amount of potassium hydroxide.

We have now found that substantially higher yields of phenyl o-phenoxybenzoate may be produced by the substitution of potassium carbonate for the catalysts previously employed.

The production of phenyl o-phenoxybenzoate in accordance with our invention is effected by heating diphenyl-carbonate with a small proportion of potassium carbonate ($K_2CO_3$).

The reaction may be conducted at atmospheric pressure or at higher or lower pressure. At atmospheric pressure reaction begins at between 220° and 230° C. with evolution of phenol vapor. To complete the reaction at this pressure and expel (as vapor) the phenol produced, temperatures between about 250° and about 270° C. are required. Thus the entire reaction may be carried out between 220° C. and 270° C. It is preferred to operate with a gradually rising temperature as the reaction proceeds and to terminate the reaction at a temperature between 240° C. and 270° C., normally at a temperature between 250° C. and 260° C., under which conditions complete or substantially complete reaction is effected. By reducing the partial pressure of phenol, as by the application of vacuum or presence of a gaseous inert carrier, the reaction temperature may be lowered slightly. Thus, if the process is carried out at an absolute pressure of 555 mm. of mercury, the final temperature may be about 10 degrees lower than required at atmospheric pressure. If pressures below about 555 mm. of mercury are employed, diphenyl-carbonate distills off with the phenol. It may be condensed fractionally at temperatures above its solidification temperature (about 80° C.) and returned to the reaction vessel.

The proportion of potassium carbonate employed as catalyst may be only a small fraction of 1% by weight of the diphenyl-carbonate. We have found that very little difference in yield is observable whether ¼%, ½%, 1% or 2% by weight of potassium carbonate based on the weight of diphenyl-carbonate present is employed. Larger proportions of potassium carbonate, however, cause saponification of the ester product to form potassium o-phenoxybenzoate the proportion of this product increasing as the proportion of potassium carbonate is increased. Accordingly it is preferred to employ a relatively small amount, say not more than 10% of potassium carbonate to effect the desired conversion.

The following example illustrates the process of the invention.

*Example.*—100 parts by weight of dry diphenyl-carbonate are melted with one part by weight of potassium carbonate in a glass-lined, jacketed still and the melt is heated to a temperature of about 230° C. at approximately atmospheric pressure. At this temperature phenol vapor begins to distill off. The temperature is gradually raised to maintain a more or less uniform development of phenol vapor and carbon dioxide until a temperature of about 255° C. is reached and evolution of phenol vapor ceases. The reaction may be accelerated by effective agitation. The residue in the distillation vessel is composed of about 63 parts of o-phenoxy-phenyl-benzoate and one part of potassium carbonate. Potassium carbonate may be extracted from the product by washing with water. The ester may be purified if desired by distillation, preferably under vacuum, with or without prior extraction of potassium carbonate.

By the same procedure employing an equal weight proportion of potassium hydroxide in place of potassium carbonate less than 55 parts by weight of o-phenoxy-phenyl-benzoate are obtained.

By the same procedure employing an equal weight proportion of sodium carbonate in place of potassium carbonate only about 45 parts by weight of o-phenxyl-phenyl-benzoate are obtained and even to obtain this yield it is necessary to raise the temperature of the reaction mixture to about 300° C. in order to complete the reaction.

We claim:

1. The method of producing phenyl o-phenoxybenzoate, which comprises heating a melt of dry diphenyl-carbonate and potassium carbonate in which the ratio of potassium carbonate to diphenyl-carbonate is between about ¼% and about 2% at about atmospheric pressure to a temperature sufficient to expel phenol vapor from the mixture and gradually raising the temperature to maintain the evolution of phenol vapor until a temperature between 250° C. and 260° C. is attained.

2. The method of producing phenyl o-phenoxy-benzoate, which comprises heating diphenyl carbonate mixed with potassium carbonate equal in weight to between about ¼% and about 2% of the weight of the diphenyl carbonate, and maintaining temperature and pressure so correlated as to gradually expel phenol from the mixture and provide a final reaction temperature between 240° C. and 270° C.

PAUL W. BACHMAN.
BERNDT W. HAMMARÉN.

CERTIFICATE OF CORRECTION.

Patent No. 2,319,197.                                   May 18, 1943.

PAUL W. BACHMAN, ET AL.

It is hereby certified that error appears in the above numbered patent requiring correction as follows: In the grant, line 7, and in the heading to the printed specification, line 2-3, title of invention, for "O-PHENOXYL-BENZOATE" read --O-PHENOXYBENZOATE--; page 1, second column, lines 33, 43, and 48, for "o-phenoxy-phenyl-benzoate" read --phenyl o-phenoxybenzoate--; and that the said Letters Patent should be read with this correction therein that the same may conform to the record of the case in the Patent Office.

Signed and sealed this 13th day of July, A. D. 1943

(Seal)

Henry Van Arsdale,
Acting Commissioner of Patents.